Figure 1:
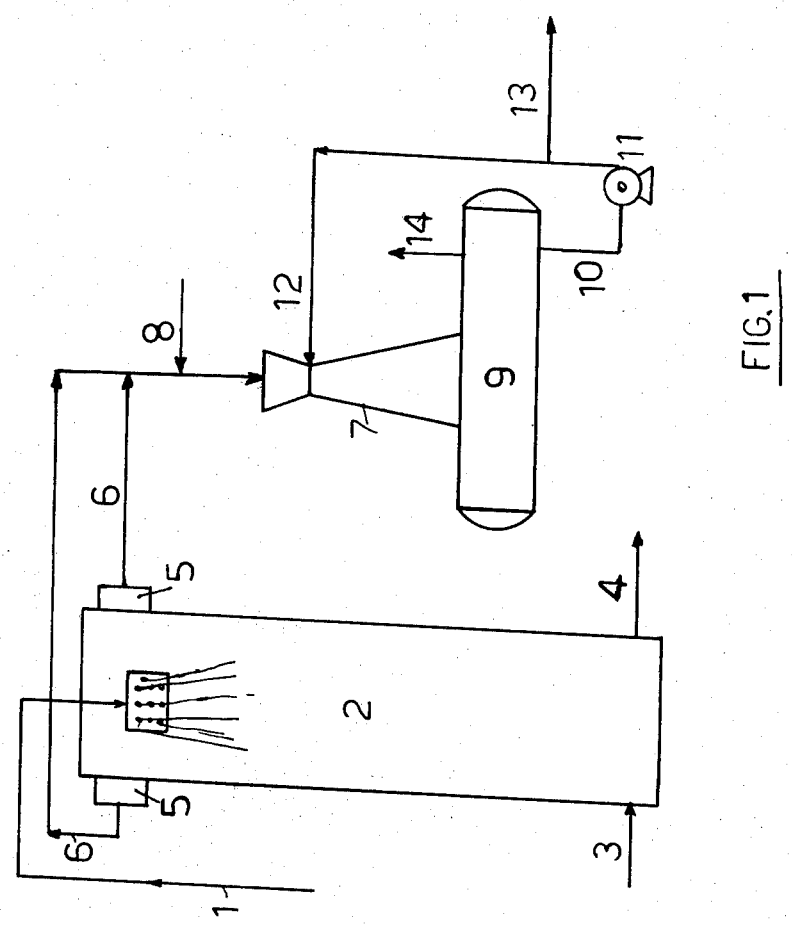

United States Patent

Lagana' et al.

[11] 4,217,114
[45] Aug. 12, 1980

[54] PROCESS FOR RECOVERING POWDERS OBTAINED FROM APPARATUSES USED FOR TREATING LIQUID OR SOLID MATERIALS

[75] Inventors: Vincenzo Lagana', Milan; Umberto Zardi, San Donato Milanese, both of Italy

[73] Assignee: Snamprogetti, S.p.A., San Donato Milanese, Italy

[21] Appl. No.: 562,798

[22] Filed: Mar. 27, 1975

[30] Foreign Application Priority Data

Mar. 28, 1974 [IT] Italy ............................... 49834 A/74

[51] Int. Cl.$^2$ ............................................. B01D 47/02
[52] U.S. Cl. ......................................... 55/70; 55/85; 71/64 DB
[58] Field of Search ................. 55/84, 85, 89, 92, 468, 55/70; 71/64 DB; 261/DIG. 54

[56] References Cited
U.S. PATENT DOCUMENTS

| | | | |
|---|---|---|---|
| 2,127,571 | 8/1938 | Pardee, Jr. | 55/468 X |
| 3,038,285 | 6/1962 | Mavrovic | 55/70 X |
| 3,130,225 | 4/1964 | Friend | 71/64 DB |
| 3,475,132 | 10/1969 | Seifert et al. | 71/64 DB |
| 3,767,174 | 10/1973 | Heeney | 261/DIG. 54 |

Primary Examiner—John Adee
Attorney, Agent, or Firm—Morgan, Finnegan, Pine, Foley & Lee

[57] ABSTRACT

Urea in powder, formed in the course of a prilling opration in which molten urea is delivered to a prilling tower adjacent its upper end for the formation of droplets which descend to the bottom of the prilling tower through a countercurrent stream of cooling air delivered to the prilling tower adjacent its lower end and which entrains that urea powder, is recovered by withdrawing the stream of air and urea powder from the upper end of the prilling tower and feeding it to an ejector connected with a collecting tank. Motive power is supplied to the ejector by feeding an aqueous liquid to it and that liquid transports the urea constituting the powder to a collecting tank from which the urea is recovered.

1 Claim, 1 Drawing Figure

PROCESS FOR RECOVERING POWDERS OBTAINED FROM APPARATUSES USED FOR TREATING LIQUID OR SOLID MATERIALS

The present invention relates to a process for recovering powders obtained from apparatuses used for treating liquid or solid materials.

More particularly the present invention relates to a process for recovering fertilizer powders from apparatuses wherein such fertilizers are prilled or granulated.

In the following description we shall make reference exclusively to that particular case even though the process is suitable to be used for recovering powders of any nature obtained from other apparatus. In the prilling and granulating of fertilizers in the apparatuses used for carrying out such operations substantial amounts of powders are discharged into the air, said powders being transported by air utilized in both operations for cooling the obtained granules or prills.

By "prilling" we mean that operation wherein a melted mass of fertilizer is sprayed inside a very tall chamber and in countercurrent to the drops of liquid so formed a stream of air flows so as to cool the drops and solidify the same.

The product obtained by prilling is in the form of prills. When reference is made to the specific case of the preparation of prilled urea it is known that, for preparing said prilled urea, melted urea is sent to suitable spraying systems and the obtained drops meet an uprising stream of air. In such a way urea prills are collected at the tower bottom, said prills being discharged by suitable means.

The powders, which form, leave the prilling tower from the top or in proximity of the top and can be either directly discharged in the air or recovered.

The direct discharge of the urea powders in the air clearly presents the drawback of the loss of urea and moreover also problems of pollution of the air and surrounding soil.

According to the known art said powders can be recovered by means of cyclones working in dry or wet conditions.

The cyclones working in dry conditions have a very low efficiency and therefore effect low recovery of the powders; their operation is moreover rather expensive since for passing air rich in powders coming from the prilling tower through a cyclone said air has to be compressed. Cyclones working under wet conditions have given better results in so far as the recovery is concerned but they always entail a high cost due to the necessary compression of air.

We have now found that it is possible to recover completely the powders leaving prilling or granulation plants at low expenses by utilizing, instead of the cyclones of the prior art, an ejector working with a liquid as driving agent. In particular and preferably, said liquid is water.

The subject of the present invention is a process for recovering the aforesaid powder consisting in feeding the air and powders mixture to an ejector for which the driving fluid is a liquid, preferably water.

The powders then dissolve in the liquid providing a solution of sufficient concentration for subsequent use as such, or one which may be further concentrated in order to recover the absorbed powders.

The process which is the subject of the present invention will now be illustrated with reference to the accompanied drawing which relates to the case of the recovery of urea from a prilling tower.

The embodiment disclosed by said drawing is not to be considered as restrictive of the invention since other schemes can be utilized without departing from the scope of the invention.

Melted urea is fed through 1 to prilling tower 2 to which air is sent through 3. The urea prills are discharged through 4. Urea powder and air are collected in manifold 5 and conveyed through tubes 6 to ejector 7.

Make up water is added through 8 to the air and powder streams before they enter ejector 7.

To the ejector, as driving fluid, stream 12 is fed, which stream is constituted by water containing dissolved urea withdrawn from tank 9 through pipe 10 and compressed by means of pump 11.

A portion of the urea enriched water is discharged through 13 and sent to a treatment (evaporation or other treatment) for recovering its urea content.

Air passed through the ejector is discharged from tank 9 through duct 14. It is clear that other embodiments of the process according to the invention are possible; the conditions being that an ejector is used for creating the vacuum sufficient to suck the air-powder mixture and that the powder is retained in the driving liquid utilized in the ejector.

It is also obvious that use can be made of a gas or mixture of gas, and not necessarily of air, for carrying away the powder and of a liquid other than water for absorbing the powder and that at last said powders need not dissolve in the liquid but may simply remain suspended in the same.

An example will now be given to illustrate the invention without restricting the same.

EXAMPLE

With reference to the accompanying drawing we fed to a prilling tower, through 3, 726,000 Ncm$^3$/hour of air, the rate of melted urea flowing through 1 being 62,500 kg/hour.

Form the top of the prilling tower, powdered urea came out (stream 6) at a rate of 625 kg/hour together with all air which had been fed.

The air-powdered urea mixture was fed to ejector 7, after addition of water introduced through 8 at a rate of 2505 kg/hour.

Through 14 all the air passed through the ejector was discharged. Water containing dissolved urea was circulated by means of pump 11 through a closed cycle constituted by pipes 10 and 12, ejector 7 and tank 9. The rate of the circulating water was 3900 m$^3$/hour.

Through 13 we discharged a stream constituted by 2505 kg/hour of water and 625 kg/hour of urea.

What we claim is:

1. The process of recovering the urea in the powder formed in the course of a prilling operation in which molten urea is delivered to a prilling tower adjacent its upper end for the formation of droplets which descend to the bottom of the prilling tower through a countercurrent stream of cooling air delivered to the prilling tower adjacent its lower end and which entrains said urea powder, wherein the improvement comprises withdrawing the stream of air and urea powder from the upper end of the prilling tower and feeding said stream to an ejector connected with a collecting tank, feeding water to said stream of air and powder withdrawn from the prilling tower at a point upstream of the ejector so that air and a solution of urea in water are fed to the collecting tank through said ejector, separating said air from the aqueous solution of urea in the collecting tank, recycling a portion of said aqueous solution of urea from the collecting tank to the ejector as the liquid supplying motive power to the ejector so that it transports the urea constituting said powder to the collecting tank, and then obtained urea from said tank.

* * * * *